United States Patent [19]

Bassani

[11] 4,100,240
[45] Jul. 11, 1978

[54] LIQUID POLYMER EXTRUSION PROCESS AND PRODUCT

[75] Inventor: Giovanni Bassani, Midland, Mich.

[73] Assignee: Dow Corning Corporation, Midland, Mich.

[21] Appl. No.: 728,328

[22] Filed: Sep. 30, 1976

[51] Int. Cl.² .......................................... B29D 23/05
[52] U.S. Cl. .................................... 264/108; 138/174;
  260/37 SB; 264/173; 264/174; 264/209; 428/36
[58] Field of Search ................. 264/68, 174, 172, 173,
  264/176 R, 176 C, 209, 349, 240, 108; 425/113,
  206, 207; 260/37 SB; 428/295, 447, 36;
  138/174, 177

[56] References Cited

U.S. PATENT DOCUMENTS

| | | | |
|---|---|---|---|
| 3,279,501 | 10/1966 | Donald | 264/209 X |
| 3,651,187 | 3/1972 | Cessna | 264/108 |
| 3,697,473 | 10/1972 | Polmanteer | 260/37 SB |
| 3,953,006 | 4/1976 | Patarcity | 425/207 X |
| 4,057,610 | 11/1977 | Goettler | 138/172 X |

Primary Examiner—Thomas P. Pavelko
Attorney, Agent, or Firm—Howard W. Hermann

[57] ABSTRACT

In accordance with a preferred embodiment of this invention there is provided a process for extruding an oriented-fiber reinforced tubular product. This product preferably is formed from a crosslinked polysiloxane elastomer produced by the curing of a fiber containing "liquid polymer" polysiloxane precursor. The subject process involves pumping the fiber containing precursor through a heated non-pumping extruder. The extruder initiates the curing reaction, shapes the reacting precursor into a tubular form and orients the fibers.

2 Claims, 4 Drawing Figures

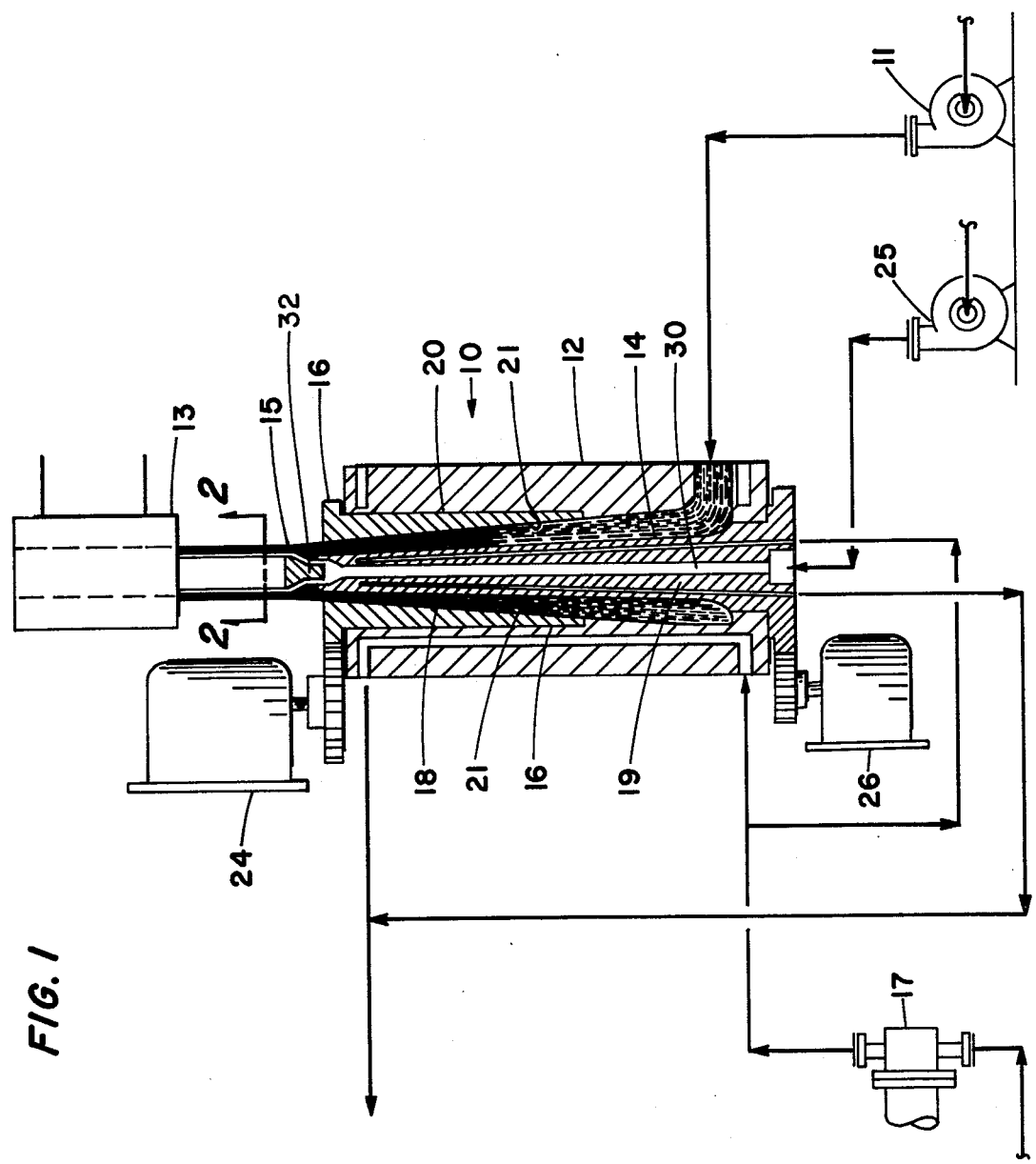

LIQUID POLYMER EXTRUSION PROCESS AND PRODUCT

This invention relates to a method of continuously extruding a fiber containing "liquid polymer" precursor to form a thermosetting, oriented-fiber reinforced tubular product.

There are presently several thermosetting polymer resins which are molded by injection or transfer type processes. Most of these processes are designed to shape a well defined quantity of a heated reacting resin by ramming it into a mold before the resin sets up and plugs the injection apparatus. Continuous techniques, such as extrusion, are avoided because of the problems of controlling the curing reaction.

Recently, several polymer systems have been developed in which one or more low viscosity ingredients react, when heated and/or mixed, to quickly form an intractable crosslinked elastomer. These systems have been referred to as "liquid polymers" and they offer many advantages. For example, the initial ingredients for these resins have such low viscosities that little energy and time is consumed in transporting them through a machine and into a mold. Therefore, high production rates are easily achieved with these new materials. In addition, the use of a "liquid polymer" in injection molding operations frequently eliminates flash problems and allows the use of simple mold and mold runner designs; furthermore, the need for the conventional but expensive screw-type equipment is eliminated.

To date, the most widely used means of processing these "liquid polymers" has been injection molding. Typically, these processes employ a two-component "liquid polymer" in which the reactive components are stored separately to ensure a reasonable shelf life. Complex equipment of processing these materials has been designed to keep the reactants separate until the last possible instant and then to vigorously mix a specific quantity of each and then to immediately inject this reacting blend into a mold. Elaborate impingement mixers have been developed to efficiently mix these ingredients as quickly as possible to prevent the mixture from setting up before it reaches the mold.

To date, the inventor is not aware of any commercially available method for extruding a single component, low viscosity "liquid polymer" precursor which cures to form a crosslinked elastomer. A persistent problem has been the continuous nature of the extrusion process as compared to the batch type injection molding processes. More specifically, this problem involves controlling the process so that the material is out of the machine before it sets up and plugs the equipment and yet curing the resin sufficiently inside the machine so that the final product has acceptable dimensional stability. The additional requirement of orienting reinforcing fibers in a particular manner to obtain maximum strength simply compounds the problem.

Hereinafter, the term "precursor" will be used to designate a single, low viscosity, fiber containing ingredient which when extruded in accordance with this invention quickly reacts to form the desired oriented-fiber reinforced thermosetting tubular product. Typically, the precursor will be a fiber containing blend of low molecular weight, highly reactive polymer compounds having a viscosity in the range of from about 20 to 4000 centipoise (1 pascal-second = 10.00 poise); in addition, the precursor will typically contain an inhibitor to provide adequate stability. The effect of the inhibitor may be overcome and the curing reaction initiated by heating the precursor. It is noted that a one molecular species may contain the necessary reactive functionalities and serve as the precursor. In this instance, the single molecule would contain two distinct moieties which when heated react to form the desired thermosetting elastomer.

OBJECTS OF THE INVENTION

This invention provides an improved process for continuously forming a tubular product from a low viscosity, fiber containing "liquid polymer" precursor, which rapidly reacts when heated to form a crosslinked, fiber reinforced elastomer. In addition, the subject process orients the fibers in the precursor before it solidifies and this orientation both provides increased strength to he final product and facilitates the extrusion process.

This invention also provides an improved process for continuously extruding a low viscosity, fiber containing polysiloxane (i.e., silicone) "liquid polymer" precursor, which reacts when heated to form a crosslinked, fiber reinforced polysiloxane elastomer. In addition, the subject process orients the fibers in the precursor before it solidifies and this orientation both provides increased strength in the final product and facilitates the process.

This invention further provides an improved process for continuously extruding a two-layered tubular structure wherein at least one layer is formed from a fiber containing, "liquid polymer" precursor. In addition, the subject process orients the fibers in the precursor before it solidifies and this orientation both provides increased strength in the final product and facilitates the process.

This invention further provides process for continuously extruding a two-layered tubular structure wherein at least one of said layers is formed from the fiber containing, polysiloxane (i.e., silicone) "liquid polymer" precursor which reacts when heated to form a crosslinked, fiber reinforced polysiloxane elastomer. In addition, the subject process orients the fibers in the precursor before it solidifies and this orientation provides both increased strength in the final product and facilitates the process. The second layer is a sealing layer which may be a "liquid polymer" resin or a conventional elastomer.

Furthermore, this invention provides a fiber reinforced, braidless tubular product made of a thermosetting elastomer; the product is formed by continuously extruding a "liquid polymer" precursor. The fibers are oriented in a helical or hoop-like pattern as the heated and reacting precursor passes through a non-pumping extruder. The fiber orientation provides both increased strength in the final product and eliminates the need for a woven braid in many applications; the fiber orientation also facilitates the process.

In addition, this invention provides a fiber reinforced, braidless tubular product made of a thermosetting polysiloxane elastomer; this product is formed by continuously extruding a polysiloxane (i.e., silicone) "liquid polymer" precursor. The fiber being oriented in a helical or hoop-like pattern as the heated and reacting precursor passes through a non-pumping extruder. The fiber orientation provides both increased strength in the final product and facilitates the process.

This invention further provides a two-layer, braidless, tubular product wherein one layer provides strength and the other seals the product. The strength providing layer is an oriented-fiber reinforced thermosetting elastomer continuously formed from a "liquid polymer" precursor. The sealing layer is an elastomer formed from either a second "liquid polymer" precursor or a conventional elastomer.

SUMMARY OF THE PRESENT INVENTION

The above objects and advantages may be realized in accordance with a peferred embodiment of this invention, by pumping a low viscosity, "liquid polymer" polysiloxane precursor through a non-pumping extruder which heats the precursor to initiate the curing reaction and which subjects the reacting precursor to a controlled shearing action. The precursor contains reinforcing fibers, some of which are oriented as the precursor cures by the shearing action into a helical or hoop-wise pattern; the orientation increases the strength of both the final cured product and the semi-cured extrudate as it emerges from the die of the subject extruder. The shearing action will orient the fibers in a direction and to a degree which are controllable by the magnitude and direction of the shearing action. By the use of this technique it is possible to produce an oriented-fiber reinforced product at a high rate of speed without the use of a conventional screw-type extruder.

These advantages are achieved by the use of the low viscosity "liquid polymer" precursor which is easily pumped through the subject extruder at a high rate of speed. It is believed that the high production rate is also due in part to the fact that the oriented fibers lend strength to the semi-cured extrudate as it leaves the subject extruder. This reduces the extent of cure necessary for the precursor to reach a substantially self-sustaining state and furthermore reduces the risk of the precursor setting up in and plugging the extruder.

U.S. Pat. No. 3,651,187 teaches that a reinforcing fiber may be oriented in a thermoplastic tubular extrudate by passing the viscous fiber containing melt through an annular die wherein one of the forming surfaces is rotated. However, this reference does not relate to a method of extruding a low viscosity "liquid polymer" precursor in which a curing reaction must occur under carefully controlled conditions to produce the desired product at the intended high production rates.

The preferred polysiloxane "liquid polymer" precursor is a uniform blend of (1) an organosilicone oligomer having occasional aliphatically unsaturated pendent groups; (2) a crosslinking agent which is typically a second organosilicone oligomer having an occasional hydrogen atom bonded to a silicon atom and (3) a catalyst such as chloroplatinic acid. An inhibitor such as methyl butynol is added to provide storage stability. When this blend is heated, the effect of the inhibitor is overcome an a rapid curing reaction is initiated. This reaction is the SiH addition across the carbon-carbon double bond.

This curing or polymerization reaction is fully described in the following U.S. Pat. Nos. 2,823,218; 3,419,593 and 3,697,473. These patents are hereby specifically incorporated by reference to describe the curing reaction and to describe a variety of suitable materials. These materials would include those organosiloxane oligomers and crosslinking agents described in the above patents which may be inhibited and blended into a precursor having a viscosity in the range of from 20 to 4000 centipoise as measured by a Brookfield viscometer at room temperature and which, when heated, react to form a crosslinked siloxane elastomer in a period of from about $\frac{1}{4}$ to about 4 seconds and preferably from $\frac{1}{2}$ to 3 seconds. It is noted that faster curing systems may be used if the pump has the capacity to feed the material at a sufficient rate.

Preferably, the organosilicone oligomer is a linear dimethylsiloxane having an occasional methyl group, in either a terminal or pendent position, replaced by a vinyl ($CHCH_2$) group. This compound may be referred to as a prepolymer. Similarly, the crosslinking agent is also preferably, a dimethylsiloxane oligomer; however, in this case an occasional methyl group is replaced by a hydrogen atom. The crosslinking agent is often referred to as an SiH compound.

The number of hydrogen groups in the SiH compound and the number of vinyl groups on the prepolymer are adjusted so that the SiH to SiVi ratio is within a range of from about 1 to about 2 and preferably from 1.3 to 1.6. The optimum SiH to SiVi ratio will depend on the particular compounds used; however, the SiH should always be in excess. Typically, the catalyst is present in an amount ranging from 1 to 100 parts per million (ppm) platinum based on the total composition.

The above description relates to the production of a thermosetting (i.e., crosslinked) polysiloxane wire coating. However, it is emphasized that this invention may also be used to apply a coating of other thermosetting "liquid polymer" systems. However, the reactive ingredients of preferably candidate systems should have viscosities, and cure times similar to those of the preferred polysiloxane systems. Suitable examples would include the polyurethane "liquid polymers" which have received so much interest from the injection molders and the polysulfide liquid polymer which has been developed and marketed by the Thiokol Corporation. Dow Corning has developed suitable polysiloxane "liquid polymer" systems.

The polyurethane systems typically involve the amine catalyzed reaction of an isocyanate (NCO) functionality with a hydroxyl (OH) functionality. The NCO containing compound is typically toluene dissocyanate and the hydroxyl containing compound is typically a polyoxyalkylene polyol or a mixture of such polyols. The polysulfide reaction typically involves the peroxide catalyzed reaction of an SH endcapped polyoxyalkylene with either another SH or a point of ethylenic unsaturation.

In evaluating a new candidate, factors which should be considered include the viscosity of the individual components at a suitable reaction temperature and the cure time once the components are mixed at that temperature.

The objects, advantages and features of the subject invention will be more easily understood in view of the following detailed description of a preferred embodiment. This description will make reference to the attached drawings in which:

FIG. 1 is a cross-sectional view taken through a vertical center line of the subject extruder; this view also schematically shows the auxiliary equipment needed to supply the precursor and an internal coating resin and to supply heat;

Figure 4:
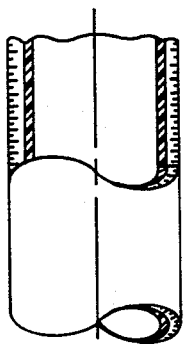
FIG. 4 is a broken away perspective view of a tubular product having its fibers oriented in a hoop-wise pattern.

More specifically, there is schematically shown in FIG. 1 a pump 11 to supply the "liquid polymer" precursor under pressure to the subject extruder 10; an oven 13 to heat the semi-cured tubular extrudate 15 and thereby complete the curing reaction after the extrudate has left the extruder 10; and a suitable heat source 17 for the extruder 10. During operation the extruder 10 must be maintained at a temperature which is sufficient to immediately raise the temperature of the precursor to a suitable reaction temperature in the range of from about 80° C. to about 200° C. and allow the reaction to progress to a point that the reacting precursor has reached a substantially self-sustaining state; the total residence time of the precursor in the extruder will be about a second or less.

It is important that the heat source 17 for the extruder be easily and accurately adjusted since it will be necessary to closely control the extent of the reaction which takes place in the extruder. This heat source 17 may simply be an electrical power source connected to heating elements in the extruder or a heat source which employs a liquid heat exchange medium. It is noted that the inhibited precursor may be preheated (by a heat source which is not shown) to a temperature just below that point at which the effect of the inhibitor is overcome and the curing reaction is initiated. This would reduce the heat load on the extruder.

If the extruder 10 is too cold, the curing reaction will not have reached a point where the extrudate is in a substantially self-sustaining state as it leaves the die 16 and therefore the semi-cured extrudate 15 and the final product will have very poor dimensional stability. While on the other hand, if the liquid polymer precursor is heated too much in the subject extruder 10, the curing reaction will proceed too far and the material will "set up" in and plug the extruder 10; this requires an extensive cleaning operation. After the semi-cured extrudate emerges from the die 16, it enters an oven 13, which maintains the extrudate at a suitable curing temperature and thereby drives the curing reaction toward completion.

In more detail, the subject extruder 10 comprises a base member 12 in which are mounted a core 14 and a die 16 which has a cylindrical segment 20 extending down into the extruder 10. Both the die 16 and the core 14 may be rotated. The exterior surface 19 of the core 14, and the interior surface 21 of the die 16 are the forming surfaces which shape the precursor as it reacts to form the desired tubular product. More specifically, these surfaces form a chamber 18 through which the "liquid polymer" precursor must pass and as this occurs the desired tubular shape is formed and the fibers are oriented in a specific direction or directions. In addition, the precursor is heated to initiate and carry the curing reaction to a point that as the semi-cured extrudate 15 leaves the die 16 it has reached a substantially self-sustaining state. Preferably, the tubular product is extruded vertically upwards because the take-up equipment (which receives the product from the extruder) can be adjusted to minimize the stress on the semi-cured extrudate as it emerges from the die 16.

Either or both of the core 14 and die 16 may be rotated to apply a shearing action to the reacting "liquid polymer" precursor. This shearing action provides an adjustable degree of fiber orientation. The highest degree of shearing action and therefore fiber orientation would be obtained by rotating the core 14 in one direction and the die 16 in the opposite direction; however, it is preferred that the core 14 is stationary and that only the die 16 be rotated. This is preferred because rotating the core 14 will necessitate the use of complex connecting devices to provide heat to the core 14 and to provide a coating material which may be used to seal the inside of the tubular product. The shearing action imposed on the reacting precursor by rotating either the die 16 or the core 14 will have the greatest orienting effect on those fibers nearest that particular moving surface and a gradually diminishing effect on those fibers remote from that surface. In view of this, it is apparent that the fibers in one wall of a tube produced in accordance with this invention may be oriented in two directions if the die 16 and the core 14 rotate in opposite directions. The fibers nearest a surface will be oriented in a direction determined by the rotation of that surface. It may also be advisable to alter the length of the cylindrical portion 20 of the die 16 to modify the total shearing action applied to the precursor. In addition, the core 14 may be divided longitudinally into sections, and one or more of these sections may be independently rotated. For example, the forward half of the core 14 (that is, the half nearest the die 16) could be detached from the back portion of the die and mounted on a rod which is extended back through the center of the core and out of the extruder 10. This rod could then be held stationary or rotated and this action would be directly translated to the forward end of the core 14. These modifications may be preferred as the subject process is tuned to maximize throughput by such steps as reducing the viscosity of the precursor, increasing the temperature of the extruder 10 and the like. The die 16 is rotated by a first motor 24 and the core 14 is rotated by a second motor 26.

It is noted that the subject extruder 10 may be properly termed a non-pumping extruder because it, in no way, provides a significant force to propel the reacting precursor toward the die 16. This process relies predominately on the original pressure supplied by pump 11 to carry the reacting precursor through the extruder 10. This emphasizes the importance of regulating the temperature and the pressure under which the precursor enters the extruder 10, and thereby controlling the extent to which the "liquid polymer" precursor cures in the extruder 10. The non-pumping feature of the subject extruder 10 is a significant departure from conventional extruders which elay on a rotating screw to pump the resin through the machine.

The effect of rotating at least one of the forming surfaces and imposing a shearing action on the fiber containing "liquid polymer" precursor is an orientation of the fiber in a hoop-wise or helical pattern, the axis of which is on or near the axis of the tubular product. A similar effect is described inthe aforementioned U.S. Pat. No. 3,451,187 issued to Dr. Lawrence C. Cessna. This patent is hereby incorporated by reference for the purpose of describing the orienting effect of the shearing action on the fibers in a fluid. It is noted that Dr. Cessna does not use the term shearing action but rather addresses this phenomenon in terms of velocity components and velocity gradients which are imposed on a thermoplastic, fiber containing resin by action of a rotating die and a converging or diverging chamber. More precisely the U.S. Pat. No. 3,651,187 patent describes a method of orienting fibers in a hoop-wise pattern by creating in the flow stream a radial gradient in the longitudinal velocity and both a radial and longitudinal gradient in the circumferential velocity. This hoop-wise orientation would be preferred in the subject process to obtain the maximum strength; however, it may not be necessary to obtain this high degree of orientation to produce an acceptable tubing at the desired high rate of speed.

In the practice of the subject invention the fiber orientation serves two functions. First, the oriented fiber provides physical support to the semi-cured extrudate 15 as it emerges from the die 16 and this reduces the degree of cure needed for acceptable dimensional stability. In turn, this broadens the acceptable ranges of certain operating parameters and increasing the process' tolerance for fluctuation in these parameters and thereby allow higher production rates. Secondly, the oriented fiber provides increased strength to the tubular product which is qualified for applications previously filled primarily by tubular products reinforced with a woven braid.

Figure 3:
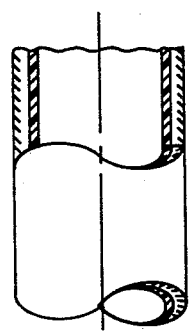
FIG. 3 is a broken away perspective view of a tubular product having its fibers oriented in a helical pattern.
Figure 2:
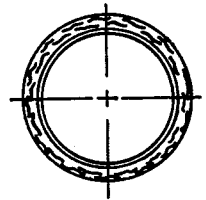
FIG. 2 is a cross-sectional view of the semi-cured extrudate.

In summary, the subject invention provides the means for continuously extruding a low viscosity, "liquid polymer" precursor at exceptionally high rates and thereby forming a comparatively inexpensive, strong tubular product. However, it is noted that in certain applications it may not be necessary to orient the fiber to the extreme hoop pattern as shown in FIG. 4 and disclosed in the U.S. Pat. No. 3,651,187 patent. A helical or near helical orientation as shown in FIG. 3 may be sufficient.

As the polymer tube emerges from the die 16, the subject extruder 10 may also be used to apply a polymer coating to the internal surface of the tube. This coating material may be either a conventional thermoplastic resin or a second liquid polymer or even the same type of liquid polymer that forms the tube except that the internal coating would not contain a fiber. This internal coating operation may be accomplished by passing the coating material through channel 30 which is located in core 14 and then on through coating die 32 which would apply the coating to the internal surface of the tubular extrudate. If a typical thermoplastic material is used it will, of course, be necessary to attach a conventional screw-type extruder to channel 30. Comparatively, if a liquid polymer type system is used a resin pump 25 similar to pump 11 may be used to inject the coating material through extruder 10. It is noted that the internal coating would serve two functions. First, to seal the inner surface of the extrudate and secondly to lend physical support to the extrudate as it emerges from the die. It is preferred that the internal coating material does not contain a fiber or particulate filler, since a filler may reduce the coating's ability to effectively seal the tubular product.

While my invention has been described in terms of certain specific embodiments, it will be appreciated that other forms thereof could readily be adapted by one skilled in the art. Therefore, the scope of my invention is not to be limited to the specific embodiments disclosed.

That which is claimed is:

1. A method of forming an oriented-fiber reinforced elastomeric tubular product by continuously extruding a liquid polymer precursor, said method employing a heated non-pumping extruder having rotatable forming surfaces to shape the precursor as it cures into said tubular product, said precursor being characterized by a room temperature Brookfield viscosity in the range of from 20 to 4000 centipoise and a cure time when heated to from about 150° to 250° C. of about 3 to about $\frac{1}{2}$ seconds and wherein said non-pumping extruder the fibers are oriented to both provide increased strength to the tubular product and to facilitate said method by adding strength to the semi-cured extrudate as it emerges from said non-pumping extruder; said method comprising the steps of:
    (a) pumping said fiber containing liquid polymer precursor through said non-pumping extruder which is heated to initiate the curing reaction said precursor having a residence time in said extruder such that as the curing precursor emerges from the die it has reached a substantially self-sustaining state; and simultaneously
    (b) rotating at least one of the forming surfaces to orient said fibers; and
    (c) heating the semi-cured extrudate to drive the curing reaction toward completion.

2. A method of forming an oriented-fiber reinforced elastomeric polysiloxane tubular product by continuously extruding a liquid polymer polysiloxane precursor, said metod employing a heated non-pumping extruder having rotatable forming surfaces to form the precursor as it cures into said tubular product, said precursor being characterized by a room temperature viscosity in the range of from 20 to 4000 centipoise and a cure time when heated to from about 150° to 250° C. of about 3 to about $\frac{1}{2}$ seconds and wherein said non-pumping extruder the fibers are oriented to both provide increased strength to the tubular product and to facilitate said method by adding strength to the semi-cured extrudate as it emerges from said non-pumping extruder; said method comprising the steps of:
    (a) pumping said fiber containing liquid polymer precursor through said non-pumping extruder which is heated to initiate the curing reaction said precursor having a residence time in said extruder such that as the curing precursor emerges from the die it has reached a substantially self-sustaining state; and simulatenously
    (b) rotating at least one of the forming surfaces to orient said fibers; and
    (c) heating the semi-cured extrudate to drive the curing reaction toward completion.

* * * * *

UNITED STATES PATENT AND TRADEMARK OFFICE
CERTIFICATE OF CORRECTION

PATENT NO. : 4,100,240
DATED : July 11, 1978
INVENTOR(S) : Giovanni Bassani

It is certified that error appears in the above-identified patent and that said Letters Patent are hereby corrected as shown below:

Column 1, line 36, "of" should read --for--.

Column 1, line 68, after the word "adequate" insert --storage--.

Column 2, line 17, "he" should read --the--.

Column 4, line 26, "preferably" should read --preferable--.

Column 6, line 47, "elay" should read --rely--.

Column 6, line 54, "inthe" should read --in the--.

Signed and Sealed this

Third Day of March 1981

[SEAL]

Attest:

RENE D. TEGTMEYER

Attesting Officer

Acting Commissioner of Patents and Trademarks